(12) United States Patent
Zhao

(10) Patent No.: US 12,262,189 B2
(45) Date of Patent: Mar. 25, 2025

(54) AUDIO TRANSMISSION METHOD AND ELECTRONIC DEVICE

(71) Applicant: VIVO MOBILE COMMUNICATION CO., LTD., Dongguan (CN)

(72) Inventor: Deng Zhao, Dongguan (DE)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 270 days.

(21) Appl. No.: 17/897,322

(22) Filed: Aug. 29, 2022

(65) Prior Publication Data

US 2022/0417689 A1  Dec. 29, 2022

Related U.S. Application Data

(63) Continuation of application No. PCT/CN2021/079725, filed on Mar. 9, 2021.

(30) Foreign Application Priority Data

Mar. 16, 2020  (CN) .......................... 202010181286.3

(51) Int. Cl.
*H04S 3/00* (2006.01)
*G10L 19/008* (2013.01)

(52) U.S. Cl.
CPC ............ *H04S 3/008* (2013.01); *G10L 19/008* (2013.01); *H04S 2400/01* (2013.01)

(58) Field of Classification Search
CPC ................ H04R 2420/07; H04R 5/033; H04R 2227/003; H04R 27/00; H04R 5/02;
(Continued)

(56) References Cited

U.S. PATENT DOCUMENTS 9,826,570 B1   11/2017 Gupta et al.
2005/0131558 A1*  6/2005 Braithwaite ....... H04N 21/2662
381/77
(Continued)

FOREIGN PATENT DOCUMENTS

CN        101197585 A    6/2008
CN        101283522 A   10/2008
(Continued)

OTHER PUBLICATIONS

Vanderlinde,etal., "AninvestigationofBluetoothmergencewithUltra Wideband",AdHocNetworks,2011,pp. 852-863,vol. 9.*
(Continued)

*Primary Examiner* — Lun-See Lao
(74) *Attorney, Agent, or Firm* — The Webb Law Firm

(57) ABSTRACT

An audio transmission method is performed by a first electronic device, the first electronic device is connected to a second electronic device through wireless communication, and the second electronic device includes a first channel playback apparatus and a second channel playback apparatus. The audio transmission method includes: obtaining target audio, and decoding the target audio into a first channel audio signal and a second channel audio signal; and transmitting the first channel audio signal to the first channel playback apparatus through an ultra wide band transport protocol, and transmitting the second channel audio signal to the second channel playback apparatus through the ultra wide band transport protocol.

20 Claims, 2 Drawing Sheets

(58) Field of Classification Search
CPC .............. G10L 19/008; H04M 1/72442; H04S 2400/01; H04S 3/008; H04S 2420/03; H04S 7/304; H04W 4/80; H04W 24/00; H04W 4/18; H04B 3/00; H04H 20/71; H04N 21/234327; H04N 21/2662; H04N 21/43615; H04N 21/43637; H04N 21/44231; H04N 21/485; H04N 5/445; H04N 5/50; H04N 7/16
USPC ............................ 381/17–22, 56–58; 700/94
See application file for complete search history.

(56) References Cited

U.S. PATENT DOCUMENTS

| | | |
|---|---|---|
| 2007/0086600 A1 | 4/2007 | Boesen |
| 2007/0135046 A1 | 6/2007 | Kapur et al. |
| 2008/0013619 A1 | 1/2008 | Meylan et al. |
| 2008/0125189 A1 | 5/2008 | Tomoda |
| 2009/0074216 A1 | 3/2009 | Bradford et al. |
| 2009/0170436 A1 | 7/2009 | Olofsson |
| 2012/0163181 A1* | 6/2012 | Xue ............... H04W 52/383 370/241 |
| 2012/0224478 A1 | 9/2012 | Hansen et al. |
| 2014/0323036 A1 | 10/2014 | Daley et al. |
| 2017/0238214 A1 | 8/2017 | Park et al. |
| 2023/0006711 A1 | 1/2023 | Zhao |

FOREIGN PATENT DOCUMENTS

| | | |
|---|---|---|
| CN | 101637012 A | 1/2010 |
| CN | 101911661 A | 12/2010 |
| CN | 104700839 A | 6/2015 |
| CN | 104936102 A | 9/2015 |
| CN | 106101901 A | 11/2016 |
| CN | 106937197 A | 7/2017 |
| CN | 206775493 U | 12/2017 |
| CN | 108810860 A | 11/2018 |
| CN | 109219008 A | 1/2019 |
| CN | 109817232 A | 5/2019 |
| CN | 110536409 A | 12/2019 |
| CN | 113223539 A | 8/2021 |
| CN | 113411787 A | 9/2021 |
| EP | 2114047 A1 | 11/2009 |
| EP | 3419262 A1 | 12/2018 |
| JP | 2001034435 A | 2/2001 |
| JP | 2008136134 A | 6/2008 |
| JP | 2011035632 A | 2/2011 |

OTHER PUBLICATIONS

Xia, Lu et al., "A combination scheme of Bluetooth and ultra wideband wireless communication technology", Computer Age, Dec. 31, 2007, vol. 11.

\* cited by examiner

AUDIO TRANSMISSION METHOD AND ELECTRONIC DEVICE

CROSS-REFERENCE TO RELATED APPLICATIONS

This application is a Bypass Continuation Application of PCT/CN2021/079725 filed Mar. 9, 2021; and claims priority to Chinese Patent Application No. 202010181286.3 filed on Mar. 16, 2020, the disclosures of which are hereby incorporated by reference in their entirety.

BACKGROUND OF THE INVENTION

Field of the Invention

The present disclosure relates to the field of communication technologies, and in particular, to an audio transmission method and an electronic device.

Description of Related Art

With the rapid development of wireless communication technology and the gradual expansion of the market, the radio transmission technology of the audio is applied more and more widely in wireless communications. Currently, when an electronic device transmits an audio through the Bluetooth, audio files with a large amount of data cannot be transmitted due to the limitation of transmission bandwidth, and can only be transmitted in an advanced audio coding (ACC) and other compression-transmission-decompression manners. However, in the process of compression-transmission-decompression, the sound quality of the audio files may be damaged, which may affect the play effect of the audio files.

SUMMARY OF THE INVENTION

Embodiments of the present disclosure provide an audio transmission method and an electronic device.

According to a first aspect, an embodiment of the present disclosure provides an audio transmission method, performed by a first electronic device, where the first electronic device is connected to a second electronic device through wireless communication, the second electronic device includes a first channel playback apparatus and a second channel playback apparatus, and the audio transmission method includes:
- obtaining target audio, and decoding the target audio into a first channel audio signal and a second channel audio signal; and
- transmitting the first channel audio signal to the first channel playback apparatus through an ultra wide band transport protocol, and transmitting the second channel audio signal to the second channel playback apparatus through the ultra wide band transport protocol.

According to a second aspect, an embodiment of the present disclosure further provides an electronic device, where the electronic device is a first electronic device, the electronic device is connected to a second electronic device through wireless communication, the second electronic device includes a first channel playback apparatus and a second channel playback apparatus, and the electronic device includes:
- an obtaining module, configured to obtain target audio, and decode the target audio into a first channel audio signal and a second channel audio signal; and
- a transmission module, configured to transmit the first channel audio signal to the first channel playback apparatus through an ultra wide band transport protocol, and transmit the second channel audio signal to the second channel playback apparatus through the ultra wide band transport protocol.

According to a third aspect, an embodiment of the present disclosure further provides an electronic device, including a processor, a memory, and a computer program stored in the memory and executable on the processor, and when the computer program is executed by the processor, steps of the audio transmission method according to the first aspect are implemented.

According to a fourth aspect, an embodiment of the present disclosure further provides a non-transitory computer-readable storage medium, where the non-transitory computer-readable storage medium stores a computer program, and when the computer program is executed by a processor, steps of the audio transmission method according to the first aspect are implemented.

According to a fifth aspect, an embodiment of the present disclosure further provides a computer program product stored in a non-transitory computer-readable storage medium, and when the computer program product is executed by at least one processor, steps of the audio transmission method according to the first aspect are implemented.

According to a sixth aspect, an embodiment of the present disclosure further provides an electronic device, configured to execute steps of the audio transmission method according to the first aspect.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DESCRIPTION OF INVENTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

An embodiment of the present disclosure provides an audio transmission method, and the audio transmission method is performed by a first electronic device, such as a mobile phone, a tablet computer, a computer, a wearable device, and the like. The first electronic device is connected to a second electronic device through wireless communication, such as a Bluetooth connection; the second electronic device includes a first channel playback apparatus and a second channel playback apparatus. For example, the second electronic device is an earphone, the first channel playback apparatus is a left earphone, and the second channel playback apparatus is a right earphone; or the second electronic device is an audio system, the first channel playback apparatus is a left-channel audio system, and the second channel playback apparatus is a right-channel audio system.

Figure 1:
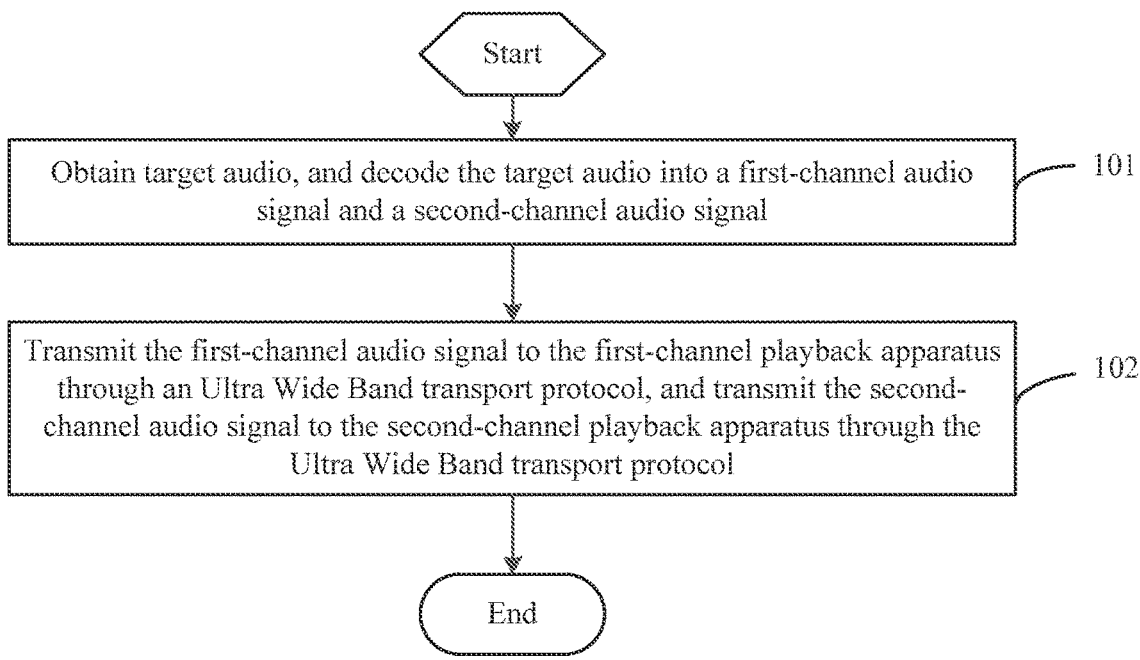
FIG. 1 is a flowchart of an audio transmission method according to an embodiment of the present disclosure.

Referring to FIG. 1, FIG. 1 is a flowchart of an audio transmission method according to an embodiment of the present Disclosure. As shown in FIG. 1, the audio transmission method includes the following steps.

Step 101: Obtain target audio, and decode the target audio into a first channel audio signal and a second channel audio signal.

Optionally, the target audio may be an audio to be played or currently being played in the first electronic device. For example, in a case of receiving a touch operation of a user on a music play button, the first electronic device obtains the target audio; or in a case of receiving a touch operation of a user on a video play button, the first electronic device obtains the target audio. In a case of obtaining the target audio, the first electronic device decodes the target audio into a first channel audio signal and a second channel audio signal.

Step 102: Transmit the first channel audio signal to the first channel playback apparatus through an ultra wide band transport protocol, and transmit the second channel audio signal to the second channel playback apparatus through the ultra wide band transport protocol.

To better describe this solution, in the following implementation of the embodiment of the present disclosure, an earphone is used as the second electronic device, a left earphone of the earphone is used as the first channel playback apparatus, and a right earphone of the earphone is used as the second channel playback apparatus for specific description.

In this embodiment of the present disclosure, in a case of establishing a wireless connection between the first electronic device and the headset, the first electronic device decodes the target audio into a left-channel audio signal and a right-channel audio signal. In addition, the left-channel audio signal is transmitted to the left earphone through an ultra wide band (UWB) transport protocol, and the right-channel audio signal is transmitted to the right earphone through the UWB transport protocol.

It can be understood that the electronic device is usually provided with a Bluetooth chip, so as to transmit the audio signal to the earphone based on the Bluetooth transport protocol. However, a transmission bandwidth of Bluetooth is only 3 Mbps, and if an overhead of the transport protocol is also considered, an actual transmission rate of audio is even smaller, which limits the transmission of an audio file of the electronic device. A transmission speed supported by the UWB transport protocol has reached 27 Mbps. In this embodiment of the present disclosure, the first electronic device can transmit the left-channel audio signal to the left earphone and transmit the right-channel audio signal to the right earphone based on the UWB transport protocol, so that the first electronic device can transmit the audio with higher quality and higher resolution requirements, to avoid sound quality damage caused by the low transmission rate, and ensure the audio transmission quality and playback effect.

As an implementation, step 102 may include:
calling media access control (MAC) and a physical layer (PHY) in the ultra wide band transport protocol through an alternate medium access control/physical layer (AMP) controller and a protocol adaptation layer (PAL) in a Bluetooth transport protocol, transmitting the first channel audio signal to the first channel playback apparatus, and transmitting the second channel audio signal to the second channel playback apparatus.

It should be noted that there is an alternate medium access control/physical layer (Alternate Medium Access Control/Physical layer, AMP) controller in the Bluetooth transport protocol. The AMP controller is a secondary controller of a Bluetooth transmission system, and is a primary controller of a basic rate and an enhanced rate (BR/EDR), which is used for searching, pairing, connection establishment, and connection maintenance; and when a logical link control and adaptation protocol (L2CAP) connection between two BR/EDR Bluetooth devices is established, the AMP controller can detect an AMP controller of another device. When both Bluetooth devices have the AMP controller, the Bluetooth transmission system provides a mechanism for data flow to migrate from the primary controller to the secondary controller. Each AMP controller is provided with a protocol adaptation layer (PAL). In a protocol stack layered architecture diagram, the PAL is above the MAC and the PHY, and the function of the PAL is to map the Bluetooth protocol in the primary controller to the AMP controller.

In this embodiment of the present disclosure, the first electronic device and the earphone are connected by Bluetooth. The first electronic device can use the AMP and the PAL as secondary transmission link control interfaces to call the MAC and the PHY in the 802.15.4a ultra wide band transport protocol, so as to transmit audio signals without changing the Bluetooth transport protocol. Further, the left-channel audio signal is transmitted to the left earphone, and the right-channel audio signal is transmitted to the right earphone. In this way, the first electronic device may transmit, on the basis of the already set Bluetooth chip and the existing Bluetooth transport protocol, a left-channel audio signal and a right-channel audio signal separately by invoking a transmission bandwidth of 27 Mbps in the ultra wide band transport protocol, which increases the transmission rate of the audio signal, enables the first electronic device to transmit the audio with higher quality and higher bandwidth, so as to avoid damage to the sound quality of the audio. In addition, convenience of the first electronic device and the Bluetooth headset for networking and pairing, as well as the compatibility for the Bluetooth headset are retained.

Optionally, the first electronic device may be provided with a first Bluetooth chip and a second Bluetooth chip, the first Bluetooth chip is used to encode the left-channel audio signal, and transmit the encoded left-channel audio signal to the left earphone based on the ultra wide band transport protocol. The second Bluetooth chip is used to encode the right-channel audio signal, and transmit the encoded right-channel audio signal to the right earphone based on the ultra wide band transport protocol. In this way, the first electronic device can process and transmit the left-channel audio signal and the right-channel audio signal respectively through the two Bluetooth chips, which increases the transmission channel and the transmission bandwidth of the audio.

Alternatively, the first electronic device may also be provided with only one Bluetooth chip. After encoding the left-channel audio signal and the right-channel audio signal, the Bluetooth chip transmits the left-channel audio signal to the left earphone, and transmits the right-channel audio signal to the right earphone based on the ultra wide band transport protocol.

Optionally, step 102 may further include:

in a case that a transmission bandwidth required for transmitting the first channel audio signal and the second channel audio signal is greater than a preset bandwidth, transmitting the first channel audio signal to the first channel playback apparatus through the ultra wide band transport protocol, and transmitting the second channel audio signal to the second channel playback apparatus through the ultra wide band transport protocol.

It can be understood that the first electronic device transmits, on the basis of the already set Bluetooth chip and the existing Bluetooth transport protocol, an audio signal by invoking the MAC and the PHY in the ultra wide band transport protocol through the AMP and the PAL. The first electronic device still retains the Bluetooth chip, and thus can still transmit the audio signal through the Bluetooth transport protocol.

It should be noted that the bandwidth of the Bluetooth transport protocol is 3 Mbps, while the transmission bandwidth of the ultra wide band transport protocol is 27 Mbps. In this embodiment of the present disclosure, after decoding the target audio into the left-channel audio signal and the right-channel audio signal, the first electronic device may make a judgment on the transmission bandwidth required for transmitting the left-channel audio signal and the right-channel audio signal. In a case that the required transmission bandwidth is greater than the preset bandwidth, the left-channel audio signal and the right-channel audio signal are correspondingly transmitted to the left earphone and the right earphone through the ultra wide band transport protocol.

For example, the preset bandwidth is 3 Mbps, and when the transmission bandwidth required for transmitting the left-channel audio signal is greater than 3 Mbps, and the transmission bandwidth required for transmitting the right-channel audio signal is also greater than 3 Mbps, it is no longer suitable to transmit the audio signal through the Bluetooth transport protocol. Then the left-channel audio signal and the right-channel audio signal may be transmitted through the ultra wide band transport protocol, so as to ensure that the first electronic device can transmit the high-quality audio. In addition, there is no need to perform compression-transmission-decompression operations on the high-quality audio through AAC, which avoids damage to the sound quality.

In some embodiments, after step 101, the method may further include: in a case that the transmission bandwidth required for transmitting the first channel audio signal and the second channel audio signal is less than or equal to the preset bandwidth, transmitting the first channel audio signal to the first channel playback apparatus through the Bluetooth transport protocol, and transmitting the second channel audio signal to the second channel playback apparatus through the Bluetooth transport protocol.

It can be understood that if the transmission bandwidth of the Bluetooth transport protocol is 3 Mbps, the preset bandwidth may be set to 3 Mbps; and when the transmission bandwidth required for transmitting the left-channel audio signal is less than or equal to 3 Mbps, and the transmission bandwidth required for transmitting the right-channel audio signal is less than or equal to 3 Mbps, the left-channel audio signal is transmitted to the left earphone, and the right-channel audio signal is transmitted to the right earphone through the Bluetooth transport protocol. When the transmission bandwidth required for transmitting the left-channel audio signal is greater than 3 Mbps, and the transmission bandwidth required for transmitting the right-channel audio signal is greater than 3 Mbps, the left-channel audio signal is transmitted to the left earphone, and the right-channel audio signal is transmitted to the right earphone through the ultra wide band transport protocol. In this way, the first electronic device can select different transmission modes to transmit the audio signal based on the transmission bandwidth required for transmitting the audio signal. This increases the audio transmission mode of the first electronic device, improves the transmission rate of audio signal, and enables the first electronic device to transmit the audio with higher quality and higher bandwidth.

Figure 2:
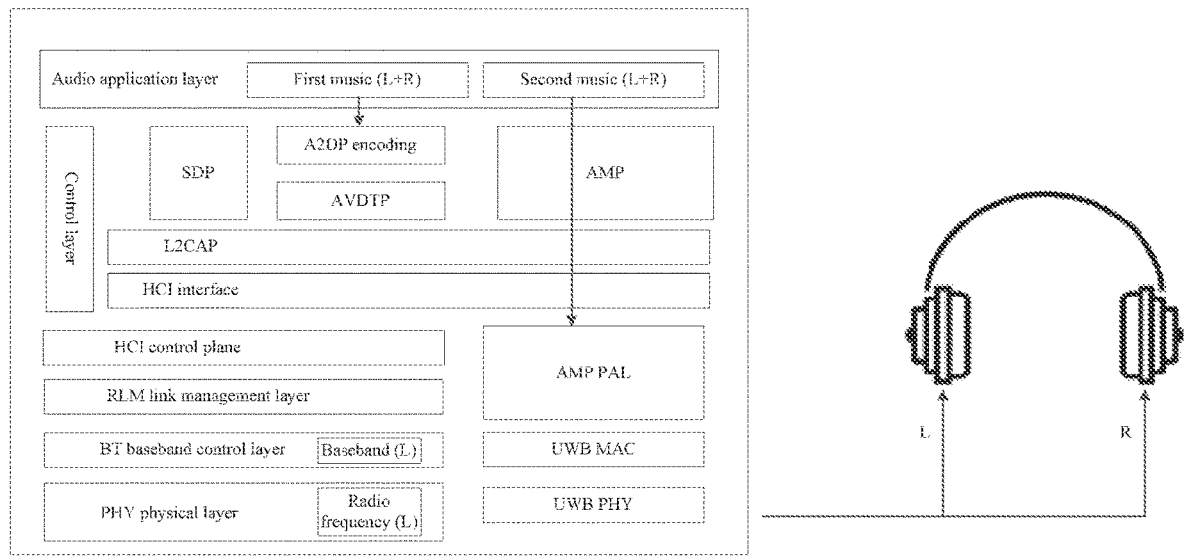
FIG. 2 is a schematic diagram of a scenario in which an audio transmission method provided in FIG. 1 is performed by an electronic device.

Referring to FIG. 2, the Bluetooth chip obtains the target audio (a first music or a second music) through an Audio application layer, and decodes the target audio into a left-channel audio signal (L) and a right-channel audio signal (R); and when a transmission bandwidth required for transmitting an audio signal of the first music (L+R) is less than or equal to the preset bandwidth, the advanced audio distribution profile (A2DP) and the audio/video distribution transport protocol (AVDTP) are used to encode the left-channel audio signal and the right-channel audio signal, and the encoded left-channel audio signal and the encoded right-channel audio signal are transmitted to the left earphone and the right earphone of the earphone respectively through a baseband unit and a radio frequency unit. It should be noted that the Bluetooth transport protocol also includes other protocols and control layers to follow, such as the session description protocol (SDP), the AMP, the L2CAP, the human computer interaction (HCI) control plane, the link manager protocol (LMP), the bit torrent (BT) baseband control layer, the PHY, and the like.

When the transmission bandwidth required for transmitting the audio signal of the second music (L+R) is greater than the preset bandwidth, the MAC and the PHY in the ultra wide band (UWB) transport protocol are invoked through the AMP and the PAL in the Bluetooth transport protocol, and the left-channel audio signal and the right-channel audio signal are transmitted to the left earphone and the right earphone respectively. In this way, the audio transmission channel of the first electronic device is expanded, thereby improving the transmission quality of the audio file, avoiding damage to the sound quality of the audio file, and ensuring the sound quality effect of the audio file.

Optionally, step 102 may further include:

in a case that the transmission bandwidth required for transmitting the first channel audio signal and the second channel audio signal is greater than the preset bandwidth, transmitting a first channel audio signal in a first bandwidth to the first channel playback apparatus through the ultra wide band transport protocol, and transmitting a first channel audio signal in a second bandwidth to the first channel playback apparatus through the Bluetooth transport protocol;

and transmitting a second channel audio signal in a third bandwidth to the second channel playback apparatus through the ultra wide band transport protocol, and transmitting a second channel audio signal in a fourth bandwidth to the second channel playback apparatus through the Bluetooth transport protocol, where a sum of the first bandwidth and the second bandwidth is a bandwidth required for transmitting the first channel audio signal; and a sum of the third bandwidth and the fourth bandwidth is a bandwidth required for transmitting the second channel audio signal.

In other words, when the transmission bandwidth required for transmitting the left-channel audio signal is greater than 3 Mbps, left-channel audio signals in a bandwidth are transmitted to the left earphone through the ultra wide band transport protocol, and remaining left-channel audio signals in another bandwidth are transmitted to the left earphone through the Bluetooth transport protocol. For example, when the transmission bandwidth required for transmitting the left-channel audio signal is 30 Mbps, left-channel audio signals in 27 Mbps are transmitted to the left earphone through the ultra wide band transport protocol, and remaining left-channel audio signals in 3 Mbps are transmitted to the left earphone through the Bluetooth transport protocol. In this way, the left-channel audio signal can be transmitted through the ultra wide band transport protocol and the Bluetooth transport protocol separately, which expands a transmission bandwidth and a transmission path of the left-channel audio signal, and enables the first electronic device to transmit the audio with higher quality, thereby bringing users a better listening experience.

Similarly, when the transmission bandwidth required for transmitting the right-channel audio signal is greater than 3 Mbps, right-channel audio signals in a bandwidth are transmitted to the right earphone through the ultra wide band transport protocol, and remaining right-channel audio signals in another bandwidth are transmitted to the right earphone through the Bluetooth transport protocol. This expands a transmission bandwidth and a transmission path of the right-channel audio signal, and ensures that the first electronic device can transmit the audio with higher quality.

In the embodiments of the present disclosure, the first electronic device obtains target audio, decodes the target audio into a first channel audio signal and a second channel audio signal, and transmits the first channel audio signal to the first channel playback apparatus through an ultra wide band transport protocol, and transmits the second channel audio signal to the second channel playback apparatus through the ultra wide band transport protocol. In this way, the first electronic device may transmit a left-channel audio signal and a right-channel audio signal separately by invoking a transmission bandwidth of 27 Mbps in the ultra wide band transport protocol, which increases the transmission bandwidth of the left-channel audio signal and the right-channel audio signal. This enables the first electronic device to transmit the audio with higher quality and higher bandwidth, so as to avoid damage to the sound quality of the audio.

Figure 3:
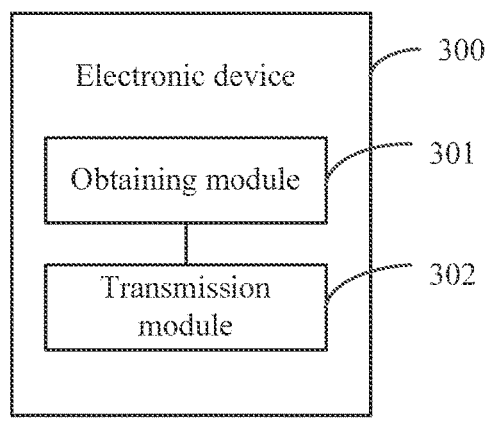
FIG. 3 is a structural diagram of an electronic device according to an embodiment of the present disclosure.

Referring to FIG. 3, FIG. 3 is a structural diagram of an electronic device according to an embodiment of the present disclosure. The electronic device is a first electronic device, the electronic device is connected to a second electronic device through wireless communication, and the second electronic device includes a first channel playback apparatus and a second channel playback apparatus. As shown in FIG. 3, the electronic device 300 includes:

an obtaining module 301, configured to obtain target audio, and decode the target audio into a first channel audio signal and a second channel audio signal; and a transmission module 302, configured to transmit the first channel audio signal to the first channel playback apparatus through an ultra wide band transport protocol, and transmit the second channel audio signal to the second channel playback apparatus through the ultra wide band transport protocol.

Optionally, the transmission module 302 is further configured to:
call media access control (MAC) and a physical layer (PHY) in the ultra wide band transport protocol through an alternate medium access control/physical layer (AMP) controller and a protocol adaptation layer (PAL) in a Bluetooth transport protocol, transmit the first channel audio signal to the first channel playback apparatus, and transmit the second channel audio signal to the second channel playback apparatus.

Optionally, the transmission module 302 is further configured to:
in a case that a transmission bandwidth required for transmitting the first channel audio signal and the second channel audio signal is greater than a preset bandwidth, transmit the first channel audio signal to the first channel playback apparatus through the ultra wide band transport protocol, and transmit the second channel audio signal to the second channel playback apparatus through the ultra wide band transport protocol.

Optionally, the transmission module 302 is further configured to:
in a case that the transmission bandwidth required for transmitting the first channel audio signal and the second channel audio signal is greater than the preset bandwidth, transmit a first channel audio signal in a first bandwidth to the first channel playback apparatus through the ultra wide band transport protocol, and transmit a first channel audio signal in a second bandwidth to the first channel playback apparatus through the Bluetooth transport protocol;
and
transmit a second channel audio signal in a third bandwidth to the second channel playback apparatus through the ultra wide band transport protocol, and transmit a second channel audio signal in a fourth bandwidth to the second channel playback apparatus through the Bluetooth transport protocol, where
a sum of the first bandwidth and the second bandwidth is a bandwidth required for transmitting the first channel audio signal; and a sum of the third bandwidth and the fourth bandwidth is a bandwidth required for transmitting the second channel audio signal.

Optionally, the transmission module 302 is further configured to:
in a case that the transmission bandwidth required for transmitting the first channel audio signal and the second channel audio signal is less than or equal to the preset bandwidth, transmit the first channel audio signal to the first channel playback apparatus through the Bluetooth transport protocol, and transmit the second channel audio signal to the second channel playback apparatus through the Bluetooth transport protocol.

It should be noted that the electronic device 300 can implement processes of the audio transmission method embodiment shown in FIG. 1 and achieve a same technical effect. To avoid repetition, details are not described herein again.

In the embodiments of the present disclosure, the electronic device 300 obtains target audio, decodes the target audio into a first channel audio signal and a second channel audio signal, and transmits the first channel audio signal to the first channel playback apparatus through an ultra wide band transport protocol, and transmits the second channel audio signal to the second channel playback apparatus through the ultra wide band transport protocol. In this way, the electronic device 300 may transmit a left-channel audio signal and a right-channel audio signal separately by invoking a transmission bandwidth of 27 Mbps in the ultra wide band transport protocol, which increases the transmission bandwidth of the left-channel audio signal and the right-channel audio signal. This enables the electronic device 300 to transmit the audio with higher quality and higher bandwidth, so as to avoid damage to the sound quality of the audio.

Figure 4:
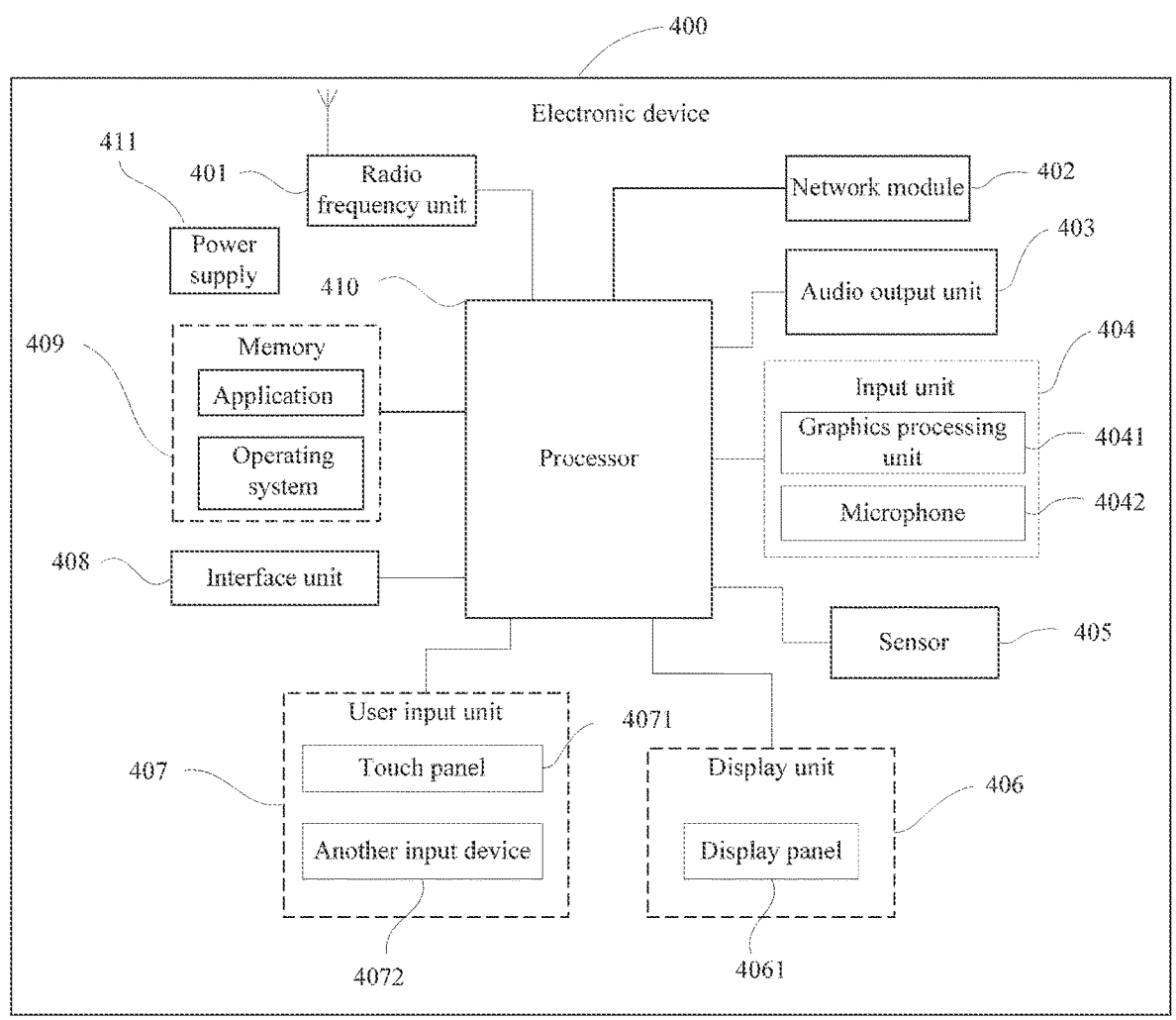
FIG. 4 is a structural diagram of another electronic device according to an embodiment of the present disclosure.

Referring to FIG. 4, FIG. 4 is a structural diagram of another electronic device according to an embodiment of the present disclosure. The electronic device 400 can implement processes of the audio transmission method embodiment shown in FIG. 1 and achieve a same technical effect. As shown in FIG. 4, the electronic device 400 includes but is not limited to: a radio frequency unit 401, a network module 402, an audio output unit 403, an input unit 404, a sensor 405, a display unit 406, a user input unit 407, an interface unit 408, a memory 409, a processor 410, a power supply 411, and other components. A person skilled in the art may understand that a structure of the electronic device shown in FIG. 4 constitutes no limitation on the electronic device 400, and the electronic device 400 may include more or fewer components than those shown in the figure, or have a combination of some components, or have a different component arrangement. In this embodiment of the present disclosure, the electronic device 400 includes but is not limited to a mobile phone, a tablet computer, a notebook computer, a palmtop computer, an in-vehicle terminal, a wearable device, a pedometer, and the like.

The processor 410 is configured to:
obtain target audio, and decode the target audio into a first channel audio signal and a second channel audio signal; and
a radio frequency unit 401 is configured to transmit the first channel audio signal to the first channel playback apparatus through an ultra wide band transport protocol, and transmit the second channel audio signal to the second channel playback apparatus through the ultra wide band transport protocol.

Optionally, the radio frequency unit 401 is further configured to:
call media access control (MAC) and a physical layer (PHY) in the ultra wide band transport protocol through an alternate medium access control/physical layer (AMP) controller and a protocol adaptation layer (PAL) in a Bluetooth transport protocol, transmit the first channel audio signal to the first channel playback apparatus, and transmit the second channel audio signal to the second channel playback apparatus.

Optionally, the radio frequency unit 401 is further configured to:
in a case that a transmission bandwidth required for transmitting the first channel audio signal and the second channel audio signal is greater than a preset bandwidth, transmit the first channel audio signal to the first channel playback apparatus through the ultra wide band transport protocol, and transmit the second channel audio signal to the second channel playback apparatus through the ultra wide band transport protocol.

Optionally, the radio frequency unit 401 is further configured to:
in a case that the transmission bandwidth required for transmitting the first channel audio signal and the second channel audio signal is greater than the preset bandwidth, transmit a first channel audio signal in a first bandwidth to the first channel playback apparatus through the ultra wide band transport protocol, and transmit a first channel audio signal in a second bandwidth to the first channel playback apparatus through the Bluetooth transport protocol; and transmit a second channel audio signal in a third bandwidth to the second channel playback apparatus through the ultra wide band transport protocol, and transmit a second channel audio signal in a fourth bandwidth to the second channel playback apparatus through the Bluetooth transport protocol, where a sum of the first bandwidth and the second bandwidth is a bandwidth required for transmitting the first channel audio signal; and a sum of the third bandwidth and the fourth bandwidth is a bandwidth required for transmitting the second channel audio signal.

Optionally, the radio frequency unit 401 is further configured to:
in a case that the transmission bandwidth required for transmitting the first channel audio signal and the second channel audio signal is less than or equal to the preset bandwidth, transmit the first channel audio signal to the first channel playback apparatus through the Bluetooth transport protocol, and transmit the second channel audio signal to the second channel playback apparatus through the Bluetooth transport protocol.

In the embodiments of the present disclosure, the electronic device 400 obtains target audio, decodes the target audio into a first channel audio signal and a second channel audio signal, and transmits the first channel audio signal to the first channel playback apparatus through an ultra wide band transport protocol, and transmits the second channel audio signal to the second channel playback apparatus through the ultra wide band transport protocol. In this way, the electronic device 400 may transmit a left-channel audio signal and a right-channel audio signal separately by invoking a transmission bandwidth of 27 Mbps in the ultra wide band transport protocol, which increases the transmission bandwidth of the left-channel audio signal and the right-channel audio signal. This enables the electronic device 400 to transmit the audio with higher quality and higher bandwidth, so as to avoid damage to the sound quality of the audio.

It should be understood that, in this embodiment of the present disclosure, the radio frequency unit 401 may be configured to receive and send information or receive and send a signal in a call process. For example, after downlink data from a base station is received, the processor 410 processes the downlink data. In addition, uplink data is sent to the base station. Usually, the radio frequency unit 401 includes but is not limited to an antenna, at least one amplifier, a transceiver, a coupler, a low noise amplifier, a duplexer, and the like. In addition, the radio frequency unit 401 may communicate with a network and another device through a wireless communication system.

The electronic device 400 provides wireless broadband Internet access for the user by using the network module 402, for example, helping the user to send and receive an e-mail, brows a web page, and access streaming media.

The audio output unit 403 may convert audio data received by the radio frequency unit 401 or the network module 402 or stored in the memory 409 into an audio signal and output the audio signal as a sound. In addition, the audio output unit 403 can further provide an audio output (for example, call signal received sound or message received sound) related to a specific function performed by the electronic device 400. The audio output unit 403 includes a loudspeaker, a buzzer, a telephone receiver, and the like.

The input unit 404 is configured to receive an audio signal or a video signal. The input unit 404 may include a graphics processing unit (GPU) 4041 and a microphone 4042. The graphics processing unit 4041 processes image data of a static image or a video obtained by an image capturing apparatus (for example, a camera) in a video capturing mode or an image capturing mode. A processed image frame may be displayed on the display unit 406. The image frame processed by the graphics processing unit 4041 can be stored in the memory 409 (or another non-transitory computer-readable storage medium) or sent via the radio frequency unit 401 or the network module 402. The microphone 4042 may receive sound and can process such sound into audio data. The processed audio data may be converted in a call mode into a format that can be sent by the radio frequency unit 401 to a mobile communication base station for outputting.

The electronic device 400 further includes at least one sensor 405 such as a light sensor, a motion sensor, and another sensor. Specifically, the light sensor includes an ambient light sensor and a proximity sensor. The ambient light sensor may adjust luminance of the display panel 4061 based on brightness of ambient light. The proximity sensor may turn off the display panel 4061 and/or backlight when the electronic device 400 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 405 may further include a fingerprint sensor, a pressure sensor, an iris sensor, a molecular sensor, a gyroscope, a barometer, a hygrometer, a thermometer, an infrared sensor, or the like. Details are not described herein again.

The display unit 406 is configured to display information input by a user or information provided for a user. The display unit 406 may include a display panel 4061, and the display panel 4061 may be configured in a form of a liquid crystal display (LCD), an organic light-emitting diode (OLED), or the like.

The user input unit 407 may be configured to: receive entered digital or character information, and generate key signal input related to a user setting and function control of the electronic device 400. The user input unit 407 includes a touch panel 4071 and another input device 4072. The touch panel 4071 is also referred to as a touchscreen, and may collect a touch operation performed by a user on or near the touch panel 4071 (for example, an operation performed by a user on the touch panel 4071 or near the touch panel 4071 by using any proper object or accessory, for example, a finger or a stylus). The touch panel 4071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 410, and receives and executes a command sent by the processor 410. In addition, the touch panel 4071 may be implemented in various types such as a resistor, a capacitor, an infrared ray, or a surface acoustic wave. The user input unit 407 may include other input devices 4072 in addition to the touch panel 4071. Specifically, the another input device 4072 may include but is not limited to: a physical keyboard, function keys (for example, a volume control key and an on/off key), a trackball, a mouse, or a joystick. Details are not described herein.

Optionally, the touch panel 4071 may cover the display panel 4061. After detecting the touch operation on or near the touch panel 4071, the touch panel 4071 transmits the touch operation to the processor 410 to determine a type of a touch event, and then the processor 410 provides corresponding visual output on the display panel 4061 based on the type of the touch event. Although the touch panel 4071 and the display panel 4061 in FIG. 4 are configured as two independent components to implement input and output functions of the electronic device 400, in some embodiments, the touch panel 4071 and the display panel 4061 may be integrated to implement the input and output functions of the electronic device 400. Details are not limited herein.

The interface unit 408 is an interface for connecting an external apparatus with the electronic device 400. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 408 may be configured to receive an input (for example, data information and power) from an external apparatus and transmit the received input to one or more elements in the electronic device 400 or may be configured to transmit data between the electronic device 400 and the external apparatus.

The memory 409 may be configured to store a software program and various data. The memory 409 may mainly include a program storage area and a data storage area. The program storage area may store an operating system, an application required by at least one function (for example, a sound play function or an image display function), and the like. The data storage area may store data (for example, audio data or an address book) or the like created based on use of a mobile phone. In addition, the memory 409 may include a high-speed random access memory, and may further include a nonvolatile memory, for example, at least one magnetic disk storage device, a flash storage device, or another volatile solid-state storage device.

The processor 410 is a control center of the electronic device 400, connects all parts of the entire electronic device 400 by using various interfaces and lines, and performs various functions of the electronic device 400 and data processing by running or executing a software program and/or a module that are/is stored in the memory 409 and by invoking data stored in the memory 409, thereby performing overall monitoring on the electronic device 400. The processor 410 may include one or more processing units. Optionally, an application processor and a modem processor may be integrated into the processor 410. The application processor mainly processes an operating system, a user interface, an application, and the like. The modem processor mainly processes wireless communications. It can be understood that, alternatively, the modem processor may not be integrated into the processor 410.

The electronic device 400 may further include the power supply 411 (for example, a battery) supplying power to each component. Optionally, the power supply 411 may be logically connected to the processor 410 by using a power management system, so as to implement functions such as charging management, discharging management, and power consumption management by using the power management system.

In addition, the electronic device 400 includes some function modules not shown. Details are not described herein.

Optionally, an embodiment of the present disclosure further provides an electronic device, including a processor, a memory, and a computer program stored in the memory and executable on the processor. When the computer program is executed by the processor, processes of the audio transmission method embodiment shown in FIG. 1 are implemented, and a same technical effect can be achieved. To avoid repetition, details are not described herein again.

An embodiment of the present disclosure further provides a non-transitory computer-readable storage medium. The non-transitory computer-readable storage medium stores a computer program, where when the computer program is executed by a processor, processes of the audio transmission method embodiment shown in FIG. 1 are implemented, and a same technical effect can be achieved. To avoid repetition, details are not described herein again. The non-transitory computer-readable storage medium includes a read-only memory (ROM), a random access memory (RAM), a magnetic disk, an optical disc, or the like.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. Without more restrictions, an element defined by the statement "including a . . . " does not exclude another same element in this process, method, article, or apparatus that includes the element.

By means of the foregoing description of the embodiments, a person skilled in the art may clearly understand that the method in the foregoing embodiments may be implemented by software in addition to a necessary universal hardware platform. Certainly, the method in the foregoing embodiments may also be implemented by hardware. However, in many cases, the former is a preferred embodiment. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An audio transmission method, performed by a first electronic device, wherein the first electronic device is connected to a second electronic device through wireless communication, the second electronic device comprises a first channel playback apparatus and a second channel playback apparatus, and the audio transmission method comprises:

obtaining target audio, and decoding the target audio into a first channel audio signal and a second channel audio signal; and in a case that a transmission bandwidth required for transmitting the first channel audio signal and the second channel audio signal is greater than a preset bandwidth, transmitting a first channel audio signal in a first bandwidth to the first channel playback apparatus through an ultra wide band transport protocol, and transmitting a first channel audio signal in a second bandwidth to the first channel playback apparatus through a Bluetooth transport protocol; and transmitting a second channel audio signal in a third bandwidth to the second channel playback apparatus through the ultra wide band transport protocol, and transmitting a second channel audio signal in a fourth bandwidth to the second channel playback apparatus through the Bluetooth transport protocol, wherein a sum of the first bandwidth and the second bandwidth is a bandwidth required for transmitting the first channel audio signal; and a sum of the third bandwidth and the fourth bandwidth is a bandwidth required for transmitting the second channel audio signal.

2. The method according to claim 1, further comprising:
invoking media access control (MAC) and a physical layer (PHY) in the ultra wide band transport protocol through an alternate medium access control/physical layer (AMP) controller and a protocol adaptation layer (PAL) in the Bluetooth transport protocol, transmitting the first channel audio signal to the first channel playback apparatus, and transmitting the second channel audio signal to the second channel playback apparatus.

3. The method according to claim 1, wherein after the obtaining the target audio, and decoding the target audio into the first channel audio signal and the second channel audio signal, the method further comprises:

in a case that the transmission bandwidth required for transmitting the first channel audio signal and the second channel audio signal is less than or equal to the preset bandwidth, transmitting the first channel audio signal to the first channel playback apparatus through the Bluetooth transport protocol, and transmitting the second channel audio signal to the second channel playback apparatus through the Bluetooth transport protocol.

4. The method according to claim 1, wherein the first electronic device is connected to the second electronic device through Bluetooth connection.

5. The method according to claim 1, wherein the first electronic device is provided with a first Bluetooth chip and a second Bluetooth chip, the first Bluetooth chip is used to encode the first channel audio signal, and transmit the encoded first channel audio signal to the first channel playback apparatus based on the ultra wide band transport protocol, and the second Bluetooth chip is used to encode the second channel audio signal, and transmit the encoded second channel audio signal to the second channel playback apparatus based on the ultra wide band transport protocol; or the first electronic device is provided with a single Bluetooth chip, and the single Bluetooth chip is used to encode the first channel audio signal and the second channel audio signal, transmit the encoded first channel audio signal to the first channel playback apparatus based on the ultra wide band transport protocol, and transmit the encoded second channel audio signal to the second channel playback apparatus based on the ultra wide band transport protocol.

6. An electronic device, wherein the electronic device is a first electronic device, the first electronic device is connected to a second electronic device through wireless communication, the second electronic device comprises a first channel playback apparatus and a second channel playback apparatus, and the first electronic device comprises a processor, a memory, and a computer program stored in the memory and executable on the processor, and the computer program, when executed by the processor, causes the first electronic device to perform:
- obtaining target audio, and decoding the target audio into a first channel audio signal and a second channel audio signal; and
- in a case that a transmission bandwidth required for transmitting the first channel audio signal and the second channel audio signal is greater than a preset bandwidth, transmitting a first channel audio signal in a first bandwidth to the first channel playback apparatus through an ultra wide band transport protocol, and transmitting a first channel audio signal in a second bandwidth to the first channel playback apparatus through a Bluetooth transport protocol; and transmitting a second channel audio signal in a third bandwidth to the second channel playback apparatus through the ultra wide band transport protocol, and transmitting a second channel audio signal in a fourth bandwidth to the second channel playback apparatus through the Bluetooth transport protocol, wherein
- a sum of the first bandwidth and the second bandwidth is a bandwidth required for transmitting the first channel audio signal; and a sum of the third bandwidth and the fourth bandwidth is a bandwidth required for transmitting the second channel audio signal.

7. The electronic device according to claim 6, wherein the computer program, when executed by the processor, causes the first electronic device to further perform:
- invoking media access control (MAC) and a physical layer (PHY) in the ultra wide band transport protocol through an alternate medium access control/physical layer (AMP) controller and a protocol adaptation layer (PAL) in the Bluetooth transport protocol, transmitting the first channel audio signal to the first channel playback apparatus, and transmitting the second channel audio signal to the second channel playback apparatus.

8. The electronic device according to claim 6, wherein the computer program, when executed by the processor, causes the first electronic device to further perform:
- in a case that the transmission bandwidth required for transmitting the first channel audio signal and the second channel audio signal is less than or equal to the preset bandwidth, transmitting the first channel audio signal to the first channel playback apparatus through the Bluetooth transport protocol, and transmitting the second channel audio signal to the second channel playback apparatus through the Bluetooth transport protocol.

9. The electronic device according to claim 6, wherein the first electronic device is connected to the second electronic device through Bluetooth connection.

10. The electronic device according to claim 6, wherein the first electronic device is provided with a first Bluetooth chip and a second Bluetooth chip, the first Bluetooth chip is used to encode the first channel audio signal, and transmit the encoded first channel audio signal to the first channel playback apparatus based on the ultra wide band transport protocol, and the second Bluetooth chip is used to encode the second channel audio signal, and transmit the encoded second channel audio signal to the second channel playback apparatus based on the ultra wide band transport protocol; or
- the first electronic device is provided with a single Bluetooth chip, and the single Bluetooth chip is used to encode the first channel audio signal and the second channel audio signal, transmit the encoded first channel audio signal to the first channel playback apparatus based on the ultra wide band transport protocol, and transmit the encoded second channel audio signal to the second channel playback apparatus based on the ultra wide band transport protocol.

11. A non-transitory computer-readable storage medium, storing a computer program, wherein the computer program, when executed by a processor of a first electronic device cause the first electronic device to perform:
- obtaining target audio, and decoding the target audio into a first channel audio signal and a second channel audio signal; and
- in a case that a transmission bandwidth required for transmitting the first channel audio signal and the second channel audio signal is greater than a preset bandwidth, transmitting a first channel audio signal in a first bandwidth to a first channel playback apparatus through an ultra wide band transport protocol, and transmitting a first channel audio signal in a second bandwidth to the first channel playback apparatus through a Bluetooth transport protocol; and transmitting a second channel audio signal in a third bandwidth to a second channel playback apparatus through the ultra wide band transport protocol, and transmitting a second channel audio signal in a fourth bandwidth to the second channel playback apparatus through the Bluetooth transport protocol, wherein
- a sum of the first bandwidth and the second bandwidth is a bandwidth required for transmitting the first channel audio signal; and a sum of the third bandwidth and the fourth bandwidth is a bandwidth required for transmitting the second channel audio signal; wherein
- the first electronic device is connected to a second electronic device through wireless communication, the second electronic device comprises the first channel playback apparatus and the second channel playback apparatus.

12. The non-transitory computer-readable storage medium according to claim 11, wherein the computer program, when executed by the processor, causes the first electronic device to further perform:
- invoking media access control (MAC) and a physical layer (PHY) in the ultra wide band transport protocol through an alternate medium access control/physical layer (AMP) controller and a protocol adaptation layer (PAL) in the Bluetooth transport protocol, transmitting the first channel audio signal to the first channel playback apparatus, and transmitting the second channel audio signal to the second channel playback apparatus.

13. The non-transitory computer-readable storage medium according to claim 11, wherein the computer program, when executed by the processor, causes the first electronic device to further perform:
- in a case that the transmission bandwidth required for transmitting the first channel audio signal and the second channel audio signal is less than or equal to the preset bandwidth, transmitting the first channel audio signal to the first channel playback apparatus through the Bluetooth transport protocol, and transmitting the second channel audio signal to the second channel playback apparatus through the Bluetooth transport protocol.

14. The non-transitory computer-readable storage medium according to claim 11, wherein the first electronic device is connected to the second electronic device through Bluetooth connection.

15. The non-transitory computer-readable storage medium according to claim 11, wherein the first electronic device is provided with a first Bluetooth chip and a second Bluetooth chip, the first Bluetooth chip is used to encode the first channel audio signal, and transmit the encoded first channel audio signal to the first channel playback apparatus based on the ultra wide band transport protocol, and the second Bluetooth chip is used to encode the second channel audio signal, and transmit the encoded second channel audio signal to the second channel playback apparatus based on the ultra wide band transport protocol; or the first electronic device is provided with a single Bluetooth chip, and the single Bluetooth chip is used to encode the first channel audio signal and the second channel audio signal, transmit the encoded first channel audio signal to the first channel playback apparatus based on the ultra wide band transport protocol, and transmit the encoded second channel audio signal to the second channel playback apparatus based on the ultra wide band transport protocol.

16. A computer program product, wherein the computer program product is stored in a non-transitory computer-readable storage medium, and when the computer program product is executed by at least one processor of a first electronic device, steps of the audio transmission method according to claim 1 are implemented; wherein the first electronic device is connected to a second electronic device through wireless communication, the second electronic device comprises the first channel playback apparatus and the second channel playback apparatus.

17. The computer program product according to claim 16, wherein the computer program product, when executed by the at least one processor, causes the first electronic device to further perform:

invoking media access control (MAC) and a physical layer (PHY) in the ultra wide band transport protocol through an alternate medium access control/physical layer (AMP) controller and a protocol adaptation layer (PAL) in the Bluetooth transport protocol, transmitting the first channel audio signal to the first channel playback apparatus, and transmitting the second channel audio signal to the second channel playback apparatus.

18. The computer program product according to claim 16, wherein the computer program product, when executed by the at least one processor, causes the first electronic device to further perform:

in a case that the transmission bandwidth required for transmitting the first channel audio signal and the second channel audio signal is less than or equal to the preset bandwidth, transmitting the first channel audio signal to the first channel playback apparatus through the Bluetooth transport protocol, and transmitting the second channel audio signal to the second channel playback apparatus through the Bluetooth transport protocol.

19. The computer program product according to claim 16, wherein the first electronic device is connected to the second electronic device through Bluetooth connection.

20. The computer program product according to claim 16, wherein the first electronic device is provided with a first Bluetooth chip and a second Bluetooth chip, the first Bluetooth chip is used to encode the first channel audio signal, and transmit the encoded first channel audio signal to the first channel playback apparatus based on the ultra wide band transport protocol, and the second Bluetooth chip is used to encode the second channel audio signal, and transmit the encoded second channel audio signal to the second channel playback apparatus based on the ultra wide band transport protocol; or the first electronic device is provided with a single Bluetooth chip, and the single Bluetooth chip is used to encode the first channel audio signal and the second channel audio signal, transmit the encoded first channel audio signal to the first channel playback apparatus based on the ultra wide band transport protocol, and transmit the encoded second channel audio signal to the second channel playback apparatus based on the ultra wide band transport protocol.

\* \* \* \* \*